US012184117B2

United States Patent
Zhang (10) Patent No.: US 12,184,117 B2
(45) Date of Patent: Dec. 31, 2024

(54) UNINTERRUPTIBLE POWER SUPPLY, ON-OFF CONTROL MODULE, CONTROL METHOD, AND SYSTEM

(71) Applicant: Huawei Digital Power Technologies Co., Ltd., Shenzhen (CN)

(72) Inventor: Chuntao Zhang, Dongguan (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 24 days.

(21) Appl. No.: 18/161,336

(22) Filed: Jan. 30, 2023

(65) Prior Publication Data

US 2023/0179013 A1 Jun. 8, 2023

Related U.S. Application Data

(63) Continuation of application No. PCT/CN2021/109197, filed on Jul. 29, 2021.

(30) Foreign Application Priority Data

Jul. 31, 2020 (CN) .......................... 202010762754.6

(51) Int. Cl.
*H02J 9/06* (2006.01)
*H02M 5/458* (2006.01)

(52) U.S. Cl.
CPC ........... *H02J 9/062* (2013.01); *H02M 5/4585* (2013.01)

(58) Field of Classification Search
CPC ............... H02J 9/062; H02J 9/06; H02J 9/061
See application file for complete search history.

(56) References Cited

U.S. PATENT DOCUMENTS

| | | | |
|---|---|---|---|
| 5,598,311 A | 1/1997 | Yang | |
| 8,674,823 B1* | 3/2014 | Contario | G01R 19/145 340/693.1 |
| 2012/0217809 A1 | 8/2012 | Sato et al. | |
| 2015/0108755 A1* | 4/2015 | Das | H02J 9/061 290/43 |
| 2018/0241246 A1* | 8/2018 | Heber | H02M 7/125 |
| 2018/0309319 A1* | 10/2018 | Nakano | H02J 9/06 |
| 2018/0316216 A1 | 11/2018 | Masunaga et al. | |

(Continued)

FOREIGN PATENT DOCUMENTS

| | | |
|---|---|---|
| CN | 103337901 A | 10/2013 |
| CN | 103683468 A | 3/2014 |

(Continued)

*Primary Examiner* — Ryan Johnson
(74) *Attorney, Agent, or Firm* — Slater Matsil, LLP (57) ABSTRACT

This application provides an uninterruptible power supply. An input end of the uninterruptible power supply is connected to a power supply by using a first on-off control module. A controller of the uninterruptible power supply is configured to: after receiving a first control signal sent by the first on-off control module, control a current in a circuit connecting the uninterruptible power supply and the first on-off control module to be zero. An output end of the uninterruptible power supply is connected to a load by using a second on-off control module. A controller of the uninterruptible power supply is configured to: after receiving a second control signal sent by the second on-off control module, control the uninterruptible power supply to be turned off.

16 Claims, 4 Drawing Sheets

(56) References Cited

U.S. PATENT DOCUMENTS

2020/0144854 A1\* 5/2020 Hsu .................... H02H 7/10
2022/0158483 A1\* 5/2022 Notari .................. H02J 9/068

FOREIGN PATENT DOCUMENTS

| CN | 203491725 U | 3/2014 |
|----|-------------|--------|
| CN | 205104397 U | 3/2016 |
| CN | 111162599 A | 5/2020 |
| EP | 3116006 A1  | 1/2017 |

\* cited by examiner

UNINTERRUPTIBLE POWER SUPPLY, ON-OFF CONTROL MODULE, CONTROL METHOD, AND SYSTEM

CROSS-REFERENCE TO RELATED APPLICATIONS

This application is a continuation of International Application No. PCT/CN2021/109197, filed on Jul. 29, 2021, which claims priority to Chinese Patent Application No. 202010762754.6, filed on Jul. 31, 2020. The disclosures of the aforementioned applications are hereby incorporated by reference in their entireties.

TECHNICAL FIELD

This application relates to the field of electronic power technologies, and in particular, to an uninterruptible power supply, an on-off control module, a control method, and a system.

BACKGROUND

An uninterruptible power supply (UPS) is a device that can continuously supply power to a load. The UPS mainly includes a rectifier, an inverter, and a battery. When a power supply input is normal, the power supply input supplies power to the load by using the rectifier and the inverter, and charges the battery by using the rectifier, and the UPS can output a stable voltage. When a mains input fails, the battery supplies electrical energy stored by the battery to the load by using the inverter.

An input side of the UPS is connected to a power supply (the mains) by using an on-off control module, and an output side of the UPS is connected to the load by using an on-off control module. When the on-off control modules on the two sides are disconnected, because a current exists in a circuit, a switch has an arcing problem. Therefore, only a circuit breaker (CB) or a load switch (LS) with an arc blowout function can be selected. However, costs of using the foregoing device are high, a volume is large, and arcing still shortens a useful life of the foregoing device. Therefore, regular maintenance and replacement are required, thereby further increasing the costs.

SUMMARY

To resolve the foregoing problems existing in the conventional technology, this application provides an uninterruptible power supply, an on-off control module, a control method, and a system, to avoid an arcing problem. Therefore, costs of using the on-off control module can be reduced.

According to a first aspect, this application provides an uninterruptible power supply. An input end of the uninterruptible power supply is connected to a power supply by using a first on-off control module. The uninterruptible power supply includes a controller. After receiving a first control signal sent by the first on-off control module, the controller controls a current in a circuit connecting the uninterruptible power supply and the first on-off control module to be zero. In this case, the first on-off control module is turned off, so that zero-current turn-off can be implemented on the first on-off control module, thereby reducing a loss when the first on-off control module is turned off, and prolonging a useful life of the on-off control module. Further, an on-off control module having lower costs and a smaller volume without an anti-arcing function may alternatively be used, for example, a fuse, an isolating switch, or a plug-in terminal.

With reference to the first aspect, in a first possible implementation, the uninterruptible power supply further includes a rectifier, an inverter, and a battery. The rectifier is configured to convert an alternating current provided by the power supply into a direct current and transmit the direct current to the battery and the inverter. The inverter is configured to convert the obtained direct current into an alternating current to supply power to a load of the uninterruptible power supply. The battery is configured to output the direct current to the inverter when the rectifier stops operating. The controller is specifically configured to: when the rectifier normally operates and the first control signal sent by the first on-off control module is received, control the rectifier to stop operating, and the battery outputs the direct current to the inverter, so that the current in the circuit connecting the uninterruptible power supply and the first on-off control module is zero.

In this case, the uninterruptible power supply switches from an operation mode of supplying power by a main circuit to an operation mode of supplying power by the battery. First, the current in the circuit connecting the uninterruptible power supply and the first on-off control module is enabled to be zero, and then the first on-off control module is turned off, so that zero-current turn-off can be implemented on the first on-off control module in a process of switching an operating state of the uninterruptible power supply.

With reference to the first aspect, in a second possible implementation, the uninterruptible power supply further includes a bypass circuit. One end of the bypass circuit is connected to an input end of the rectifier, and the other end is connected to an output end of the inverter. The bypass circuit is configured to: when being enabled, enable the power supply to directly supply power to the load. The controller is specifically configured to: after the bypass circuit is enabled and the first control signal sent by the first on-off control module is received, control the bypass circuit to be disconnected, so that the current in the circuit connecting the uninterruptible power supply and the first on-off control module is zero.

In this case, the rectifier switches from an operating state of supplying power by the bypass circuit to an operating state of stopping outputting (turned off). First, the current in the circuit connecting the uninterruptible power supply and the first on-off control module is enabled to be zero, and then the first on-off control module is turned off, so that zero-current turn-off can be implemented on the first on-off control module in a process of turning off the uninterruptible power supply.

According to a second aspect, this application further provides another uninterruptible power supply. An output end of the uninterruptible power supply is connected to a load by using a second on-off control module. The uninterruptible power supply includes a controller. The controller is configured to: after receiving a second control signal sent by the second on-off control module, control the uninterruptible power supply to be turned off.

When the second on-off control module needs to be turned off, it means that the uninterruptible power supply does not need to supply power to the load at this time. Therefore, in this application, the uninterruptible power supply is controlled to be turned off earlier than the second on-off control module, and a final result is still that the uninterruptible power supply stops supplying power to the load. In this way, a load side is not affected. However, zero-current turn-off is implemented on the second on-off control module, thereby reducing a loss when the second on-off control module is turned off, and prolonging a useful life of the second on-off control module. Further, an on-off control module having lower costs and a smaller volume without an anti-arcing function may alternatively be used, for example, a fuse, an isolating switch, or a plug-in terminal.

According to a third aspect, this application further provides an on-off control module. One end of the on-off control module is connected to an uninterruptible power supply, and the other end is connected to a power supply. The on-off control module is configured to send a first control signal to the uninterruptible power supply, and switch to a disconnected state when determining that a current in a circuit connecting the uninterruptible power supply is zero. The first control signal is used to indicate a controller of the uninterruptible power supply to control the current in the circuit connecting the uninterruptible power supply and a first on-off control module to be zero.

With reference to the third aspect, in a first possible implementation, the on-off control module may be any one of a fuse, a plug-in terminal, or an isolating switch.

According to a fourth aspect, this application further provides another on-off control module. One end of the on-off control module is connected to an uninterruptible power supply, and the other end is connected to a load of the uninterruptible power supply. The on-off control module is configured to send a second control signal to the uninterruptible power supply, and switch to a disconnected state when determining that a current in a circuit connecting the uninterruptible power supply is zero. The second control signal is used to indicate a controller of the uninterruptible power supply to control the uninterruptible power supply to be turned off.

With reference to the fourth aspect, in a first possible implementation, the on-off control module may be any one of a fuse, a plug-in terminal, or an isolating switch.

According to a fifth aspect, this application further provides a method for controlling an uninterruptible power supply. An input end of the uninterruptible power supply is connected to a power supply by using a first on-off control module. The method includes: after receiving a first control signal sent by the first on-off control module, controlling a current in a circuit connecting the uninterruptible power supply and the first on-off control module to be zero.

With reference to the fifth aspect, in a first possible implementation, the uninterruptible power supply further includes a rectifier, an inverter, and a battery. The rectifier is configured to convert an alternating current provided by the power supply into a direct current and transmit the direct current to the battery and the inverter. The inverter is configured to convert the obtained direct current into an alternating current to supply power to a load of the uninterruptible power supply. The battery is configured to output the direct current to the inverter when the rectifier stops operating. The after receiving a first control signal sent by the first on-off control module, controlling a current in a circuit connecting the uninterruptible power supply and the first on-off control module to be zero specifically includes:

when the rectifier normally operates and the first control signal sent by the first on-off control module is received, controlling the rectifier to stop operating, and outputting, by the battery, the direct current to the inverter, so that the current in the circuit connecting the uninterruptible power supply and the first on-off control module is zero.

With reference to the fifth aspect, in a second possible implementation, the uninterruptible power supply further includes a bypass circuit. One end of the bypass circuit is connected to an input end of the rectifier, and the other end is connected to an output end of the inverter. The bypass circuit is configured to: when being enabled, enable the power supply to directly supply power to the load. The after receiving a first control signal sent by the first on-off control module, controlling a current in a circuit connecting the uninterruptible power supply and the first on-off control module to be zero specifically includes: after the bypass circuit is enabled and the first control signal sent by the first on-off control module is received, controlling the bypass circuit to be disconnected, so that the current in the circuit connecting the uninterruptible power supply and the first on-off control module is zero.

According to a sixth aspect, this application further provides another method for controlling an uninterruptible power supply. An output end of the uninterruptible power supply is connected to a load by using a second on-off control module. The method includes: after receiving a second control signal sent by the second on-off control module, controlling the uninterruptible power supply to be turned off.

According to a seventh aspect, this application further provides a method for controlling an on-off control module. One end of the on-off control module is connected to an uninterruptible power supply, and the other end is connected to a power supply. The method includes: sending a first control signal to the uninterruptible power supply, where the first control signal is used to indicate a controller of the uninterruptible power supply to control a current in a circuit connecting the uninterruptible power supply and a first on-off control module to be zero; and switching to a disconnected state when it is determined that the current in the circuit connecting the uninterruptible power supply is zero.

According to an eighth aspect, this application further provides another method for controlling an on-off control module. One end of the on-off control module is connected to an uninterruptible power supply, and the other end is connected to a load of the uninterruptible power supply. The method includes: sending a second control signal to the uninterruptible power supply, where the second control signal is used to indicate a controller of the uninterruptible power supply to control the uninterruptible power supply to be turned off; and switching to a disconnected state when it is determined that the current in the circuit connecting the uninterruptible power supply is zero.

According to a ninth aspect, this application further provides an uninterruptible power supply system. The system includes the uninterruptible power supply or the on-off control module provided in the foregoing implementations. Specifically, the uninterruptible power supply of the uninterruptible power supply system may include an on-off control module (in other words, a first on-off control module) at an input end, or include an on-off control module (in other words, a second on-off control module) at an output end, or include an on-off control module at both the input end and the output end.

The technical solutions provided in this application have at least the following advantages.

When the input end of the uninterruptible power supply provided in this application is connected to the power supply by using the first on-off control module, the first on-off control module sends the first control signal to the controller of the uninterruptible power supply. Then the controller controls the current in the circuit between the uninterruptible power supply and the first on-off control module to be zero, and the first on-off control module is turned off, so that zero-current turn-off can be implemented on the first on-off control module. When the output end of the uninterruptible power supply is connected to the load by using the second on-off control module, the second on-off control module sends the second control signal to the controller of the uninterruptible power supply. Then the controller controls the uninterruptible power supply to stop operating, so that the current in the circuit between the uninterruptible power supply and the second on-off control module is zero. Then the second on-off control module is turned off, so that zero-current turn-off can be implemented on the second on-off control module.

To sum up, based on the technical solutions provided in this application, the on-off control module connected to the uninterruptible power supply is prevented from arcing during turn-off, thereby reducing a loss when the on-off control module is turned off, and prolonging a useful life of the on-off control module. Further, an on-off control module having lower costs and a smaller volume without an anti-arcing function may alternatively be used, for example, a fuse, an isolating switch, or a plug-in terminal.

DETAILED DESCRIPTION OF ILLUSTRATIVE EMBODIMENTS

To enable those skilled in the conventional technology to understand the solutions of this application more clearly, the following first describes a power distribution mode of an input and an output of a UPS.

Figure 1:
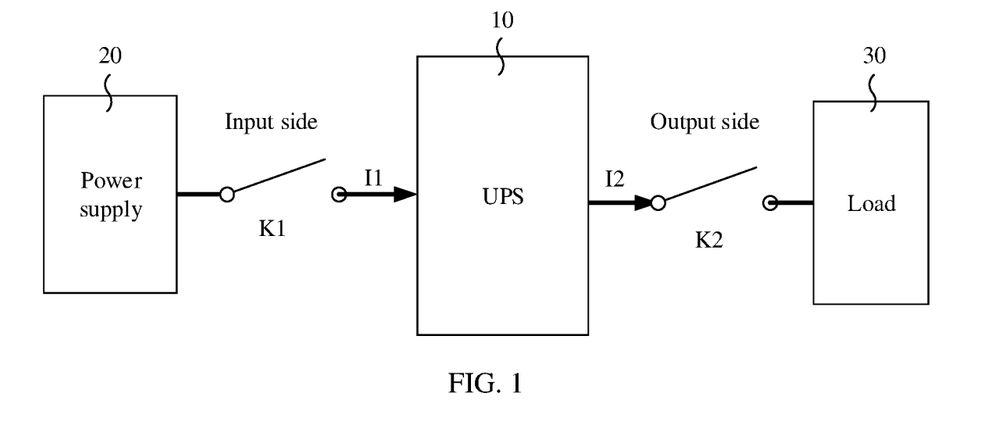
FIG. 1 is a schematic diagram of a power distribution mode of an input and an output of a UPS.

FIG. 1 is a schematic diagram of a power distribution mode of an input and an output of a UPS.

An input side of the UPS 10 is connected to a power supply 20 by using an input on-off control module K1, and an output side of the UPS 10 is connected to a load 30 by using an output on-off control module K2. When K1 and K2 are disconnected with a current, because currents I1 and I2 exist, K1 and K2 have an arcing problem. Therefore, K1 and K2 are required to have an arc blowout function, and only a circuit breaker and a load switch that have both large volumes and high costs without the arc blowout function can be selected. In addition, arcing causes damage to K1 and K2, and further shortens lives of K1 and K2. Therefore, even if K1 and K2 have the arc blowout function, K1 and K2 need to be regularly replaced, thereby increasing maintenance costs.

To resolve the foregoing problems, embodiments of this application provide an uninterruptible power supply, an on-off control module, a control method, and a system. Before the on-off control module is disconnected, the on-off control module sends a control signal to the UPS, so that a controller of the UPS controls a current in a circuit connecting the UPS and the on-off control module to be zero, thereby implementing zero-current turn-off, and preventing a switch from arcing. On the one hand, a loss when the on-off control module is turned off is reduced, and a useful life of the on-off control module is prolonged. On the other hand, an on-off control module having lower costs and a smaller volume without an anti-arcing function may alternatively be used.

To make a person skilled in the art understand the technical solutions in this application better, the following describes the technical solutions in embodiments of this application with reference to the accompanying drawings in embodiments of this application.

Terms "first", "second", and the like in the descriptions of this application are used for descriptive purposes only and should not be construed to indicate or imply relative importance or implicitly point out a quantity of indicated technical features.

In this application, unless otherwise expressly specified and limited, a term "connection" should be understood in a broad sense. For example, the connection may be a fastened connection, a detachable connection, or an integral connection, or may be a direct connection or an indirect connection based on an intermediate medium.

Embodiment 1

This embodiment of this application provides an uninterruptible power supply. Details are described below in detail with reference to the accompanying drawing.

Figure 2:
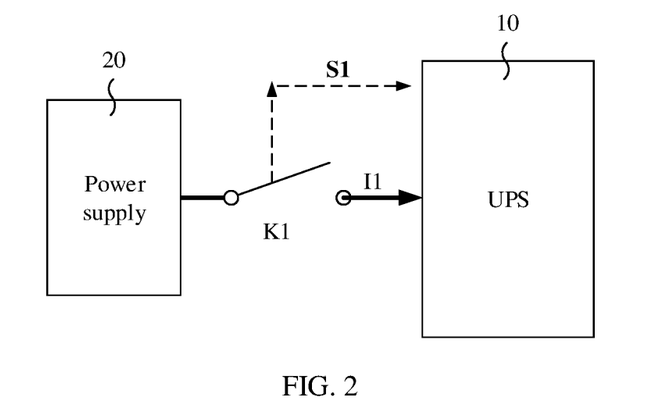
FIG. 2 is a schematic diagram of an uninterruptible power supply according to an embodiment of this application.

FIG. 2 is a schematic diagram of an uninterruptible power supply according to an embodiment of this application.

An input end of the uninterruptible power supply UPS 10 shown in the figure is connected to a power supply 20 by using a first on-off control module K1.

In some embodiments, the power supply 20 may be the mains.

The first on-off control module K1 is configured to send a first control signal S1 to the UPS 10. The first control signal S1 is used indicate a controller (not shown in the figure) of the UPS 10 to control a current in a circuit connecting the UPS 10 and the first on-off control module K1 to be zero.

After receiving the first control signal S1, the controller of the UPS 10 controls the current in the circuit connecting the UPS 10 and the first on-off control module K1 to be zero. In other words, the current I1 in this case is zero. In this case, the UPS 10 may be in a state of stopping operating, or supply power to a load 30 by using an internal battery. This is not specifically limited in this embodiment of this application.

The first on-off control module K1 then switches to a disconnected state after determining that the current I1 is zero. In this case, zero-current turn-off is implemented on the first on-off control module K1, thereby reducing a loss when the first on-off control module K1 is turned off.

To sum up, based on the solution provided in this embodiment of this application, before the first on-off control module is disconnected, the first on-off control module is enabled to first send the first control signal to the UPS, so that the controller of the UPS controls the current in the circuit connecting the UPS and the first on-off control module to be zero, thereby implementing zero-current turn-off, and avoiding an arcing problem. On the one hand, a loss when the first on-off control module is turned off is reduced, and a useful life of the on-off control module is prolonged. On the other hand, an on-off control module having lower costs without an anti-arcing function may alternatively be used. For example, an isolating switch (IS), a fuse, or a plug-in terminal may be used, to reduce costs and a volume of the on-off control module. In addition, when arcing is avoided, triggering a connected protection circuit may be further avoided. Therefore, it can be ensured that a fuse used in the circuit is not affected.

Embodiment 2

Figure 3:
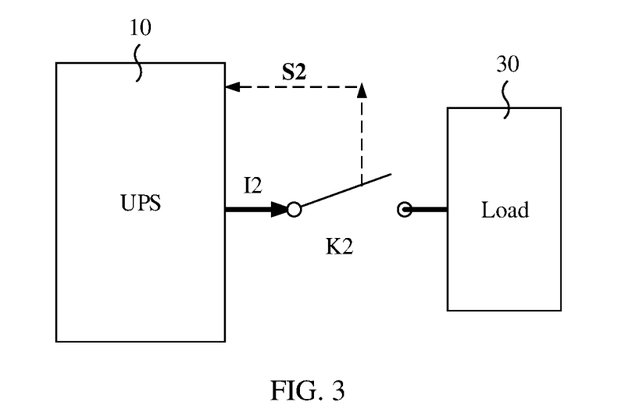
FIG. 3 is a schematic diagram of another uninterruptible power supply according to an embodiment of this application.

FIG. 3 is a schematic diagram of another uninterruptible power supply according to an embodiment of this application.

An output end of the uninterruptible power supply UPS 10 shown in the figure is connected to a load 30 by using a second on-off control module K2.

The second on-off control module K2 is configured to send a second control signal S2 to the UPS 10, and the second control signal S2 is used to indicate a controller (not shown in the figure) of the UPS 10 to control the UPS 10 to be turned off.

After receiving the second control signal S2, the controller of the UPS 10 controls the UPS 10 to be turned off. In other words, a current I2 in this case is zero.

When the second on-off control module K2 needs to be turned off, it means that the UPS 10 does not need to supply power to the load 30 at this time. Therefore, in this embodiment of this application, the UPS 10 is controlled to be turned off earlier than the second on-off control module K2, and a final result is that the UPS 10 is still enabled to stop supplying power to the load 30. In this way, a load side is not affected.

The second on-off control module K2 then switches to a disconnected state after determining that the current I2 is zero. In this case, zero-current turn-off is implemented on the second on-off control module K2, thereby reducing a loss when the second on-off control module K2 is turned off.

To sum up, based on the solution provided in this embodiment of this application, before the second on-off control module is disconnected, the second on-off control module is enabled to first send the second control signal to the UPS, so that the controller of the UPS controls the UPS to stop operating, thereby implementing zero-current turn-off, and avoiding an arcing problem. On the one hand, a loss when the second on-off control module is turned off is reduced, and a useful life of the on-off control module is prolonged. On the other hand, an on-off control module having lower costs without an anti-arcing function may alternatively be used. For example, an isolating switch (IS) or a fuse may be used, to reduce costs and a volume of the on-off control module. In addition, when arcing is avoided, triggering a connected protection circuit may be further avoided. Therefore, it can be ensured that a fuse used in the circuit is not affected.

Embodiment 3

Figure 4:
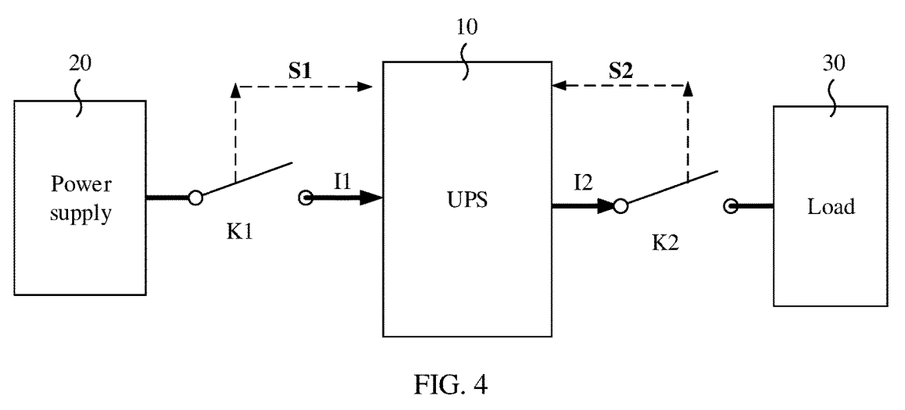
FIG. 4 is a schematic diagram of still another uninterruptible power supply according to an embodiment of this application.

FIG. 4 is a schematic diagram of still another uninterruptible power supply according to an embodiment of this application.

An input end of the uninterruptible power supply UPS 10 shown in the figure is connected to a power supply 20 by using a first on-off control module K1, and an output end is connected to a load 30 by using a second on-off control module K2.

For operating principles of the first on-off control module K1, the second on-off control module K2, and a controller of the UPS 10, refer to the foregoing embodiments. Details are not described herein in this embodiment of this application again.

Operating principles of the controller of the UPS 10 in different operating states are specifically described below by using FIG. 4 as an example. For an operating principle of the controller of the UPS in FIG. 2 or FIG. 3, refer to the corresponding part in the descriptions of FIG. 4.

Figure 5:
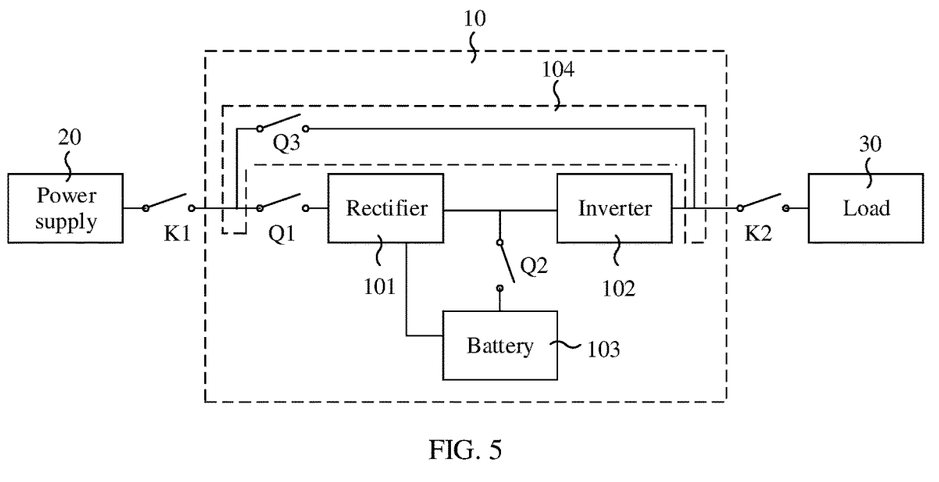
FIG. 5 is a schematic diagram of yet another uninterruptible power supply according to an embodiment of this application.

FIG. 5 is a schematic diagram of yet another uninterruptible power supply according to an embodiment of this application.

The uninterruptible power supply UPS 10 specifically includes a rectifier 101, an inverter 102, a battery 103, and a bypass circuit 104.

The rectifier 101 is configured to: convert an alternating current provided by a power supply 10 into a direct current and transmit the direct current to the battery 103, to charge the battery 103; and convert the alternating current into a direct current and transmit the direct current the inverter 102.

The inverter 102 converts the obtained direct current into an alternating current, to supply power to a load of the uninterruptible power supply.

The battery 103 is configured to output the direct current to the inverter 102 when the rectifier 101 stops operating.

One end of the bypass circuit 104 is connected to an input end of the rectifier 101, and the other end is connected to an output end of the inverter 102.

The bypass circuit 104 is configured to: when being enabled, enable a power supply 20 to directly supply power to the load 30.

Specifically, the UPS 10 may control a status of a main circuit switch Q1, a status of a battery switch Q2, and a status of a bypass switch Q3 in the UPS 10, to change an operating status. Details are described below in detail.

When the power supply 10 normally supplies power and the UPS has no fault, a main circuit of the UPS operates. That is, the main circuit switch Q1 is closed, and both the battery switch Q2 and the bypass switch Q3 are opened. In this case, an alternating current that is input by the power supply 20 to the UPS passes through the rectifier 101 and the inverter 102 and supplies power to the load 30, and charges the battery 103 by using the rectifier 101, so that the UPS can output a stable voltage to the load 30.

When the first on-off control module K1 needs to be turned off in the operating state, the first on-off control module K1 sends a first control signal to a controller of the UPS 10, so that the controller controls the rectifier 101 to stop operating and the battery 103 outputs a direct current to the inverter 102. Even if the UPS switches from main circuit output to battery output, the main circuit switch Q1 switches to an open state at this time, and the battery switch Q2 switches to a closed state, so that a current in a circuit connecting the UPS and the first on-off control module K1 is zero. Then the first on-off control module K1 is turned off, so that zero-current turn-off can be implemented on the first on-off control module K1.

When an input of the power supply 20 is faulty, the power supply 20 needs to stop supplying power, or the rectifier 101 is faulty, the battery 103 of the UPS supplies power to the load 30. In this case, the battery switch Q2 is closed, both the main circuit switch Q1 and the bypass switch Q3 are opened, and the inverter 102 converts the direct current provided by the battery 103 into an alternating current, to supply power to the load 30.

The main circuit switch Q1 is opened in the operating state, and the current in the circuit connecting the UPS and the first on-off control module K1 is zero. Therefore, the first on-off control module K1 may be turned off, and zero-current turn-off is implemented in this case.

When the inverter 102 is faulty, the bypass circuit 104 is enabled to operate. At this time, the bypass switch Q3 is conducted, both the main circuit switch Q1 and the battery switch Q2 are closed, and the power supply 20 directly supplies power to the load 30.

When the first on-off control module K1 needs to be turned off in the operating state, the first on-off control module K1 sends a first control signal to the controller of the UPS 10, so that the controller controls the bypass circuit 104 to be disconnected. In this case, the bypass switch Q3 switches to an open state, so that the current in the circuit connecting the UPS and the first on-off control module K1 is zero. Then the first on-off control module K1 is turned off, so that zero-current turn-off can be implemented on the first on-off control module K1.

However, for any of the foregoing operating states of the UPS, when a second on-off control module K2 needs to be disconnected, it indicates that there is no need to supply power to the load 30 at this time. Therefore, the second on-off control module K2 sends a second control signal to the controller of the UPS, to indicate the controller of the UPS to control the UPS to be turned off. A current that is output after the UPS is turned off is zero, and then the second on-off control module K2 is disconnected, thereby implementing zero-current turn-off.

To sum up, based on the technical solution provided in this application, the on-off control module connected to the input end and the output end of the uninterruptible power supply is prevented from arcing during turn-off, thereby reducing a loss when the on-off control module is turned off, and prolonging a useful life of the on-off control module. Therefore, an on-off control module having lower costs without an anti-arcing function may alternatively be used. For example, an isolating switch, a fuse, or a plug-in terminal may be used, to reduce costs and a volume of the on-off control module. In addition, the on-off control module does not need to have an arc blowout function. Therefore, the fuse normally operating can be ensured, and a protection action is not accidentally triggered.

Embodiment 4

Based on the uninterruptible power supply and the on-off control module provided in the foregoing embodiments, an embodiment of this application further provides a control method applied to the uninterruptible power supply and the on-off control module. Details are described below in detail with reference to the accompanying drawings.

Figure 6:
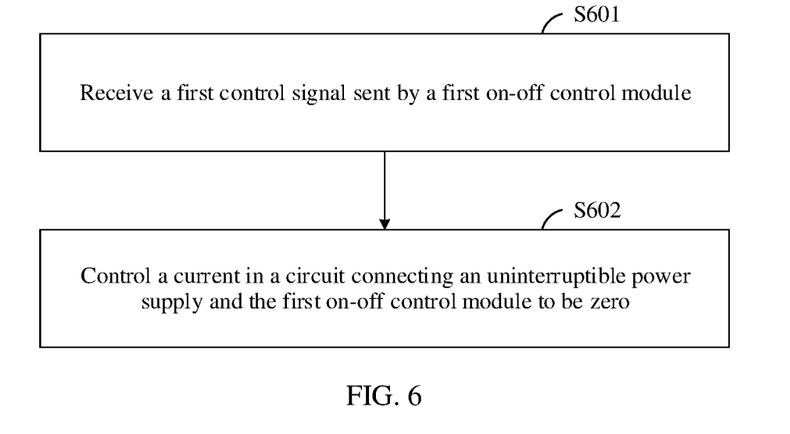
FIG. 6 is a flowchart of a method for controlling an uninterruptible power supply according to an embodiment of this application.

FIG. 6 is a flowchart of a method for controlling an uninterruptible power supply according to an embodiment of this application.

The method includes the following steps.

S601: Receive a first control signal sent by a first on-off control module.

An input end of the uninterruptible power supply is connected to a power supply by using the first on-off control module, and the first on-off control module sends the first control signal to the UPS before being disconnected.

S602: Control a current in a circuit connecting the uninterruptible power supply and the first on-off control module to be zero.

In this case, because the current in the circuit is zero, zero-current turn-off is implemented when the first on-off control module is disconnected, thereby reducing a loss of the first on-off control module.

Specifically, the UPS in practical application mainly includes a rectifier, an inverter, a battery, a bypass circuit, and the like. Operating states of the UPS includes a main circuit supplying power, the battery supplying power, and the bypass circuit supplying power.

When the main circuit supplies power, the rectifier converts an alternating current output by the power supply into a direct current, part of the direct current charges the battery, and the other part passes through the inverter to supply power to a load. In this case, if the first on-off control module is turned off, the UPS switches to a state of supplying power by the battery, and a direct current provided by the battery supplies power to the load after passing through the inverter. In this case, the foregoing step specifically includes: when the rectifier normally operates and the first control signal sent by the first on-off control module is received, controlling the rectifier to stop operating, and outputting, by the battery, the direct current to the inverter, so that the current in the circuit connecting the uninterruptible power supply and the first on-off control module is zero.

When the UPS is in a state of supplying power by the battery, the current in the circuit connecting the UPS and the first on-off control module is zero. In this case, the first on-off control module may be directly turned off, and zero-current turn-off is implemented.

When the UPS is in a state of supplying power by the bypass circuit, the bypass circuit is enabled. In this case, the power supply directly supplies power to the load by using the bypass circuit. When the first on-off control module needs to be turned off, it means that power no long needs to be supplied to the load at this time. Therefore, after receiving the first control signal sent by the first on-off control module, the UPS controls the bypass circuit to be disconnected, so that the current in the circuit connecting the uninterruptible power supply and the first on-off control module is zero.

Figure 7:
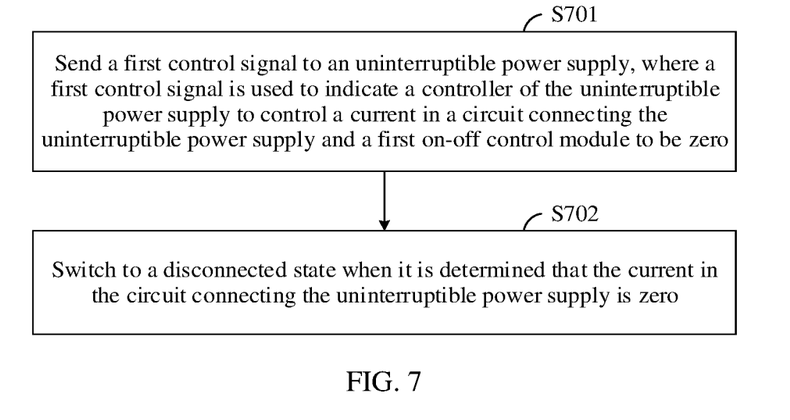
FIG. 7 is a flowchart of a method for controlling an on-off control module according to an embodiment of this application.

Correspondingly, FIG. 7 is a flowchart of a method for controlling an on-off control module according to an embodiment of this application.

The method includes the following steps.

S701: Send a first control signal to an uninterruptible power supply, where a first control signal is used to indicate a controller of the uninterruptible power supply to control a current in a circuit connecting the uninterruptible power supply and a first on-off control module to be zero.

S702: Switch to a disconnected state when it is determined that the current in the circuit connecting the uninterruptible power supply is zero.

To sum up, based on the method provided in this application, the on-off control module connected to an input end of the uninterruptible power supply is prevented from arcing during turn-off, thereby reducing a loss when the on-off control module is turned off, and prolonging a useful life of the on-off control module. Alternatively, an on-off control module having lower costs and a smaller volume without an anti-arcing function may be used. Further, because an arcing phenomenon is avoided, a protection circuit connected to the input end is not accidentally triggered, and a fuse may be normally used at the input end of the uninterruptible power supply.

Figure 8:
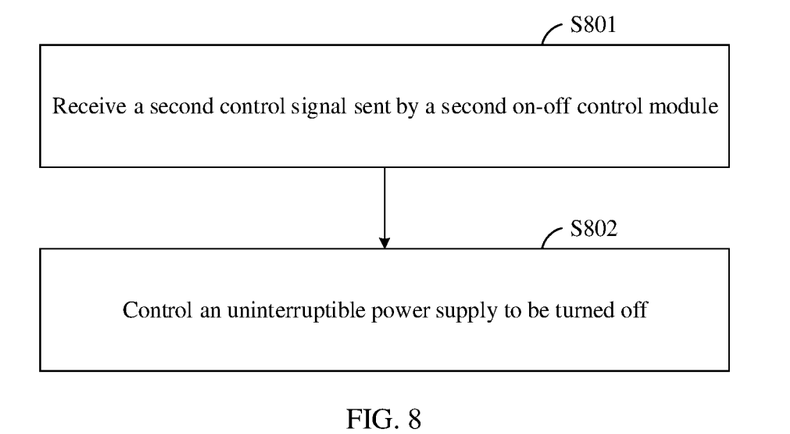
FIG. 8 is a flowchart of another method for controlling an uninterruptible power supply according to an embodiment of this application.

FIG. 8 is a flowchart of another method for controlling an uninterruptible power supply according to an embodiment of this application.

The method includes the following steps.

S801: Receive a second control signal sent by a second on-off control module.

When an output end of the uninterruptible power supply is connected to a load by using the second on-off control module, and the second on-off control module needs to be turned off, it means that the uninterruptible power supply does not need to supply power to the load at this time. Therefore, in this embodiment of this application, the uninterruptible power supply is controlled to be turned off earlier than the second on-off control module, and a final result is still that the uninterruptible power supply stops supplying power to the load. In this way, a load side is not affected.

S802: Control the uninterruptible power supply to be turned off.

Figure 9:
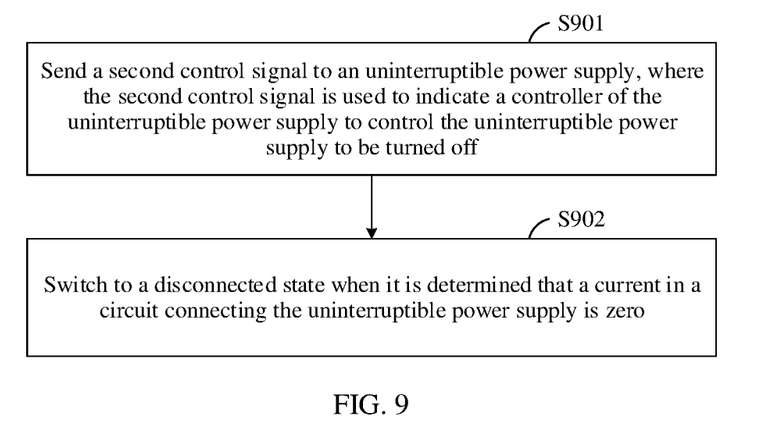
FIG. 9 is a flowchart of another method for controlling an on-off control module according to an embodiment of this application.

FIG. 9 is a flowchart of another method for controlling an on-off control module according to an embodiment of this application.

The method includes the following steps.

S901: Send a second control signal to an uninterruptible power supply, where the second control signal is used to indicate a controller of the uninterruptible power supply to control the uninterruptible power supply to be turned off.

S902: Switch to a disconnected state when it is determined that a current in a circuit connecting the uninterruptible power supply is zero.

To sum up, based on the method provided in this application, the on-off control module connected to an output end of the uninterruptible power supply is prevented from arcing during turn-off, thereby reducing a loss when the on-off control module is turned off, and prolonging a useful life of the on-off control module. Alternatively, an on-off control module having lower costs and a smaller volume without an anti-arcing function may be used, to reduce costs and a volume of the on-off control module. Further, because an arcing phenomenon is avoided, a protection circuit connected to the output end is not accidentally triggered, and a fuse may be normally used at the output end of the uninterruptible power supply.

Embodiment 5

Based on the uninterruptible power supply and the on-off control module provided in the foregoing embodiments, this embodiment of this application further provides an uninterruptible power supply system. Details are described below in detail with reference to the accompanying drawing.

Figure 10:
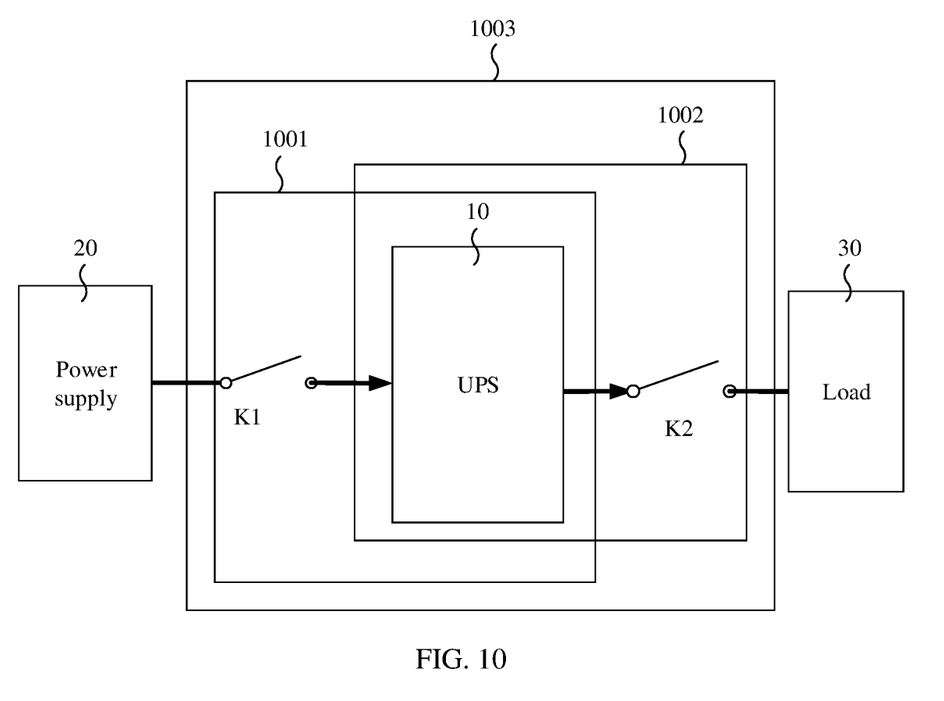
FIG. 10 is a schematic diagram of an uninterruptible power supply system according to an embodiment of this application.

FIG. 10 is a schematic diagram of an uninterruptible power supply system according to an embodiment of this application.

In a possible implementation, the uninterruptible power supply system may be in a form of 1001, to be specific, includes a UPS 10 and a first on-off control module K1. In this case, before being turned off, the first on-off control module K1 sends a first control signal to the UPS 10, so that a current in a circuit connecting the UPS 10 and the first on-off control module K1 is zero. Then the first on-off control module K1 is disconnected. Therefore, zero-current turn-off is implemented on the first on-off control module K1.

In another possible implementation, the uninterruptible power supply system may be in a form of 1002, to be specific, includes a UPS 10 and a second on-off control module K2. In this case, before being turned off, the second on-off control module K2 sends a second control signal to the UPS 10, so that the UPS 10 is turned off. Therefore, a current in a circuit connecting the UPS 10 and the second on-off control module K2 is zero. Then the second on-off control module K2 is disconnected. Therefore, zero-current turn-off is implemented on the second on-off control module K2.

In still another possible implementation, the uninterruptible power supply system may be in a form of 1003, to be specific, includes a UPS 10, a first on-off control module K1, and a second on-off control module K2. In this case, an operating principle is equivalently a combination of operating principles of the foregoing two implementations. Details are not described herein again in this embodiment of this application.

To sum up, before the on-off control module is turned off, the uninterruptible power supply system provided in this embodiment of this application controls a current in a circuit connecting the on-off control module and the uninterruptible power supply to be zero, thereby preventing the on-off control module from arcing during turn-off, reducing a loss when the on-off control module is turned off, and prolonging a useful life of the on-off control module. Alternatively, an on-off control module having lower costs and a smaller volume without an anti-arcing function may be used. The on-off control module may be connected at an input end and/or an output end of the uninterruptible power supply. Further, because an arcing phenomenon is avoided, a protection circuit connected to the output end or the input end is not accidentally triggered, and a fuse may be normally used at the output end and the input end of the uninterruptible power supply.

A controller of the uninterruptible power supply in the foregoing embodiments of this application may be an application-specific integrated circuit (ASIC), a programmable logic device (PLD), a digital signal processor (DSP), or a combination thereof. The PLD may be a complex programmable logic device (CPLD), a field programmable gate array (FPGA), generic array logic (GAL), or any combination thereof. This is not specifically limited in this embodiment of this application.

The controller may be integrated together with a controller that controls operating statuses of a switching transistor in the rectifier and a switching transistor in the inverter in the uninterruptible power supply, or the controller may be separately disposed. This is not specifically limited in this application.

It should be understood that in this application, "at least one (item)" means one or more, and "plurality" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

Embodiments in this specification are all described in a progressive manner, for same or similar parts in embodiments, reference may be made to these embodiments, and each embodiment focuses on a difference from other embodiments. The apparatus embodiments described above are merely illustrative, and the units and modules described as separate components may or may not be physically separated. In addition, some or all the units and modules may be selected based on an actual requirement to achieve the objectives of the solutions of the embodiments. A person of ordinary skill in the art may understand and implement embodiments without creative efforts.

The foregoing descriptions are merely specific implementations of this application. It should be noted that a person of ordinary skill in the art may make several improvements or polishing without departing from the principle of this application and the improvements or polishing shall fall within the protection scope of this application.

What is claimed is:

1. An uninterruptible power supply, wherein an input end of the uninterruptible power supply is connected to a power supply through a first on-off control circuit, and the uninterruptible power supply comprises:
   a controller;
   a rectifier;
   a main circuit switch connected between the rectifier and the input end of the uninterruptible power supply;
   an inverter; and
   a battery;
   wherein the rectifier is configured to convert an alternating current provided by the power supply into a direct current and transmit the direct current to the battery and the inverter;
   wherein the inverter is configured to convert the direct current into an alternating current;
   wherein the battery is configured to output the direct current to the inverter when the rectifier stops operating normally; and
   wherein the controller is configured to:
      when the rectifier operates normally and a first control signal sent by the first on-off control circuit is received by the controller, control the rectifier to stop operating and the main circuit switch to be open, wherein after the rectifier stops operating and the main circuit switch is open, the battery outputs the direct current to the inverter, and the current in the circuit connecting the uninterruptible power supply and the first on-off control circuit is zero.

2. The uninterruptible power supply according to claim 1, further comprising:
   a bypass circuit, wherein a first end of the bypass circuit is connected to an input end of the main circuit switch, and a second end of the bypass circuit is connected to an output end of the inverter;
   wherein the bypass circuit is configured to: when enabled, enable the input power supply to directly supply power to a load; and
   wherein the controller is configured to: when the bypass circuit is enabled and the first control signal sent by the first on-off control circuit is received by the controller, control the bypass circuit to be disconnected, wherein when the bypass circuit is disconnected the current in the circuit connecting the uninterruptible power supply and the first on-off control circuit is zero.

3. The uninterruptible power supply according to claim 1, wherein controlling the current in the circuit connecting the uninterruptible power supply and the first on-off control circuit to be zero comprises controlling the uninterruptible power supply to stop operating.

4. The uninterruptible power supply according to claim 1, wherein controlling the current in the circuit connecting the uninterruptible power supply and the first on-off control circuit to be zero comprises controlling the uninterruptible power supply to supply power to a load using the battery instead of the power supply.

5. An on-off control circuit, wherein a first end of the on-off control circuit is connected to an uninterruptible power supply, and a second end of the on-off control circuit is connected to a power supply; and
   wherein the on-off control circuit is configured to:
      send a first control signal to the uninterruptible power supply; and
      switch to a disconnected state when determining that a current in a circuit connecting the on-off control circuit to the uninterruptible power supply is zero, wherein the first control signal indicates to a controller of the uninterruptible power supply to control the current in the circuit connecting the uninterruptible power supply and a first on-off control circuit to be zero, and wherein the current in the circuit is zero after a main circuit switch connected between a rectifier of the uninterruptible power supply and an input end of the uninterruptible power supply is switched to be open in response to the first control signal.

6. The on-off control circuit according to claim 5, wherein the on-off control circuit comprises:
   a fuse.

7. The on-off control circuit according to claim 5, wherein the on-off control circuit comprises:
   a plug-in terminal.

8. The on-off control circuit according to claim 5, wherein the on-off control circuit comprises:
   an isolating switch.

9. An uninterruptible power supply system, comprising:
   an uninterruptible power supply comprising:
      a controller;
      a rectifier;
      a main circuit switch connected between the rectifier and an input end of the uninterruptible power supply;
      an inverter; and
      a battery;
   and
   a first on-off control circuit;
   wherein the input end of the uninterruptible power supply is connected to a power supply using the first on-off control circuit; and
   wherein the rectifier is configured to convert an alternating current provided by the power supply into a direct current and transmit the direct current to the battery and the inverter;
   wherein the inverter is configured to convert the direct current into an alternating current;
   wherein the battery is configured to output the direct current to the inverter when the rectifier stops operating normally; and
   wherein the controller is configured to:
      when the rectifier operates normally and a first control signal sent by the first on-off control circuit is received by the controller, control the rectifier to stop operating and the main circuit switch to be open, wherein after the rectifier stops operating and the main circuit switch is open, the battery outputs the direct current to the inverter, and the current in the circuit connecting the uninterruptible power supply and the first on-off control circuit is zero; and wherein a first end of the first on-off control circuit is connected to the uninterruptible power supply, and a second end of the first on-off control circuit is connected to the power supply; and wherein the first on-off control circuit is configured to:
send the first control signal to the uninterruptible power supply; and
switch to a disconnected state when determining that the current in the circuit connecting the uninterruptible power supply is zero, wherein the first control signal indicates to the controller to control the current in the circuit connecting the uninterruptible power supply and the first on-off control circuit to be zero.

10. The uninterruptible power supply system according to claim 9, wherein the uninterruptible power supply further comprises a bypass circuit;

wherein a first end of the bypass circuit is connected to an input end of the main circuit switch, and a second end of the bypass circuit is connected to an output end of the inverter;

wherein the bypass circuit is configured to: when enabled, enable the input power supply to directly supply power to a load; and wherein the controller is configured to:
after the bypass circuit is enabled and the first control signal sent by the first on-off control circuit is received, control the bypass circuit to be disconnected, wherein when the bypass circuit is disconnected the current in the circuit connecting the uninterruptible power supply and the first on-off control circuit is zero.

11. The uninterruptible power supply system according to claim 9, wherein the on-off control circuit comprises:
a fuse.

12. The uninterruptible power supply system according to claim 9, wherein the on-off control circuit comprises:
a plug-in terminal.

13. The uninterruptible power supply system according to claim 9, wherein the on-off control circuit comprises:
an isolating switch.

14. The uninterruptible power supply system according to claim 9, further comprising:
a second on-off control circuit, wherein an output end of the uninterruptible power supply is connected to a load using the second on-off control circuit.

15. The uninterruptible power supply system according to claim 14, wherein the second on-off control circuit comprises:
a fuse.

16. The on-off control circuit according to claim 14, wherein the second on-off control circuit comprises:
an isolating switch.

* * * * *